United States Patent [19]

Baumann et al.

[11] 4,006,838
[45] Feb. 8, 1977

[54] BRAZING ALLOY AND BRAZING PASTE FOR GAS CONTAINER JOINTS

[75] Inventors: Richard S. Baumann, Glenbeulah; Ronald K. Raboin, Green Bay, both of Wis.

[73] Assignee: Western Industries, Inc., Milwaukee, Wis.

[22] Filed: Feb. 17, 1976

[21] Appl. No.: 658,275

Related U.S. Application Data

[62] Division of Ser. No. 526,912, Nov. 25, 1974, abandoned.

[52] U.S. Cl. .................................. 220/3; 29/196.3; 75/159; 220/5 A; 220/81 R
[51] Int. Cl.$^2$ ....................... F17C 1/14; B32B 1/02
[58] Field of Search .................. 220/3, 5 A, 67, 75, 220/81; 75/153, 159; 29/196.3

[56] References Cited

UNITED STATES PATENTS

| | | | |
|---|---|---|---|
| 2,200,743 | 5/1940 | Hardy | 148/24 X |
| 2,458,688 | 1/1949 | Davis | 75/159 X |
| 2,514,873 | 7/1950 | Keene et al. | 75/159 X |
| 2,664,222 | 12/1953 | King | 220/3 |
| 2,911,298 | 11/1959 | Woolard | 75/159 |
| 2,914,435 | 11/1959 | Wasserman | 148/24 |
| 3,018,914 | 1/1962 | Webster | 220/3 |
| 3,697,333 | 10/1972 | Hoeffleur | 148/24 |

*Primary Examiner*—C. Lovell
*Attorney, Agent, or Firm*—James E. Nilles

[57] ABSTRACT

Component parts of a steel container for storing a gas, specifically a mixture of stabilized methylacetylene and propadiene ($C_3H_4$), are joined by a brazing alloy consisting of about 48% to 67% by weight copper; about 4.5% to about 7% by weight phosphorous and the balance nickel. During manufacture of the container, component parts may be joined either by brazing the joint with the specified alloy in wire or rod form or by applying to the joint a brazing paste comprising the specified metals unalloyed in powdered form and heating the joint in a furnace to melt and alloy the metals to form the joint. The brazing alloy has desirable metallurgical characteristics and is nonreactive to exposure to the specified gas stored in the container. The brazing paste has characteristics which enhance its utility for mass production techniques.

2 Claims, 5 Drawing Figures

BRAZING ALLOY AND BRAZING PASTE FOR GAS CONTAINER JOINTS

REFERENCE TO RELATED CO-PENDING APPLICATION

This application is a divisional application from my pending U.S. Ser. No. 526,912, filed Nov. 25, 1974 for "Brazing Alloy and Brazing Paste for Gas Container Joints" now abandoned.

BACKGROUND OF THE INVENTION

This invention relates generally to brazing alloys and to brazing pastes containing copper and adapted for use in joining component parts of metal containers used for storing a gas which adversely reacts with pure copper.

DESCRIPTION OF THE PRIOR ART

Some combustible gases useable for brazing, soldering, preheating materials and for other purposes are commercially available in small cylindrical metal containers to which appropriate burner heads can be attached. Typically, such containers are fabricated from components parts, such as tubular sections, nozzle assemblies and relief valve assemblies which are joined together in proper relationship by brazing or welding. Whether brazing or welding is used depends on whether or not the gas to be stored in the container is chemically reactive with the metal or alloy used to braze or weld the joint. For example, in containers used to store natural gas or propane the joints are usually brazed and the brazing material is typically pure copper or a copper alloy, since there is no adverse chemical reaction between such brazing material and the natural gas or propane. However, some gases react adversely with copper and it has heretofore been the practice to avoid the use of copper or copper alloys in forming the joint and to depend on welding instead. For example, there is a possibility that MAPP Gas may react with copper or alloys containing more than 67% copper to produce explosive acetylides when the gas is under high pressure and it is recommended that containers therefore be made of steel or aluminum and that joints in such containers avoid the use of copper. However, fabrication of small cylindrical steel containers by conventional welding techniques is relatively expensive and is preferably avoided. MAPP Gas, which is a mixture of stabilized methylacetylene and propadiene, is a multipurpose industrial fuel used for flame cutting, flame hardening, metallizing, welding, soldering, preheating and stress relieving, and is chemically inert to most materials including steel, brass, most plastics and rubber. MAPP is a registered trademark of the Air Reduction Company, Inc. The nature, chemical formulation, characteristics and other specific information regarding the physical properties of MAPP Gas are explained in detail in a publication of MAPP Products, P. O. Box 105, 70 Diamond Road, Springfield, New Jersey 07081, which bulletin is designated ADG-MAPP-1013 and 2-71-15M-1078.

In the fabrication of containers wherein brazing with copper or a copper alloy is permitted, it is the practice to join component parts by using brazing material in wire or rod form or by applying an extrudable brazing paste comprising powdered metal suspended in powdered form in a gelatinous vehicle to the joint and then heating the container in a furnace to effect brazing. During heating, the powdered metal melts and the vehicle is reduced to gas and driven off. However, the technique of brazing with wire does not lend itself to mass production techniques, and it is desirable to employ the method using a brazing paste. Heretofore, attempts to produce a brazing alloy and a brazing paste containing copper and suitable for making joints in containers in which MAPP Gas is to be stored have been unsuccessful. Some prior art brazing alloys, although resistant to reaction with the MAPP Gas, were either excessively fluid in the melted state and failed to provide a perfect leakproof joint or were insufficiently fluid in the melted state and did not exhibit proper flow characteristics necessary to provide a joint capable of withstanding relatively high pressure of gas in the filled container. Furthermore, in some prior art pastes the combination of metals used resulted in a brittle non-ductile alloy and joints which were subject to failure upon deformation of the container near the joint.

SUMMARY OF THE PRESENT INVENTION

In accordance with the present invention there is provided a copper brazing alloy and an extrudable brazing paste especially well adapted for use in making brazed joints in metal containers used for storing a pressurized gas, such as MAPP Gas, which reacts adversely with alloys containing more than a specified amount of copper.

A brazing alloy in accordance with the invention preferably consists of about 48% to about 67% by weight of copper; about 4.5% to about 7% by weight of phosphorous; and the balance nickel. However, an alloy comprising about 55% by weight of copper, about 6% by weight of phosphorous, and about 39% by weight of nickel heated in a furnace for about one hour at 2050° F. in a reducing atmosphere forms a suitable brazed joint.

A brazing paste in accordance with the invention consists of copper, phosphorous and nickel in the ranges or amounts hereinbefore specified suspended in powdered form in a suitable reducible gelatinous vehicle.

A brazing alloy in accordance with the invention does not react adversely when exposed to MAPP Gas under pressure and therefore is well adapted for use in forming brazed joints in metal containers in which such gas is stored or in pipe lines or systems wherein such gas is transported. The alloy is free flowing in its liquid state and well suited for use in joints wherein it must be dispersed by capillary action. The alloy, when solidified is strong enough to withstand high gas pressures, yet is non-brittle and ductile enough to resist cracking if the joint is subjected to deformation.

A brazing paste in accordance with the invention results in an alloy having the aforesaid desirable characteristics and lends itself to mass production techniques wherein the paste is applied automatically to container components as the components are moved along an assembly line prior to introduction into a furnace wherein the alloy melts and the brazing is carried out. Other objects and advantages of the invention will hereinafter appear.

DRAWINGS

DESCRIPTION OF A PREFERRED EMBODIMENT

Figure 2:
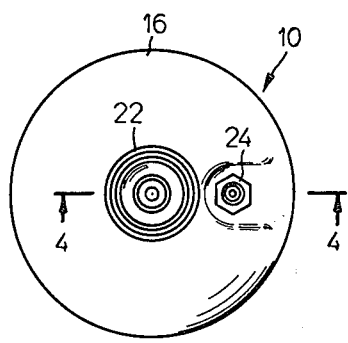
FIG. 2 is a top plan view of the container shown in FIG. 1.

In the drawings, the numeral 10 designates a cylindrical gas storage container having joints brazed with an alloy in accordance with the invention. As FIG. 1 shows, the finished container is filled with a pressurized combustible gas, such as MAPP Gas, with about 80% of the gas below a line 14 and in the liquid phase, and with about 20% of the gas above line 14 and in the vapor phase when the gas is at ambient temperatures.

Figure 1:
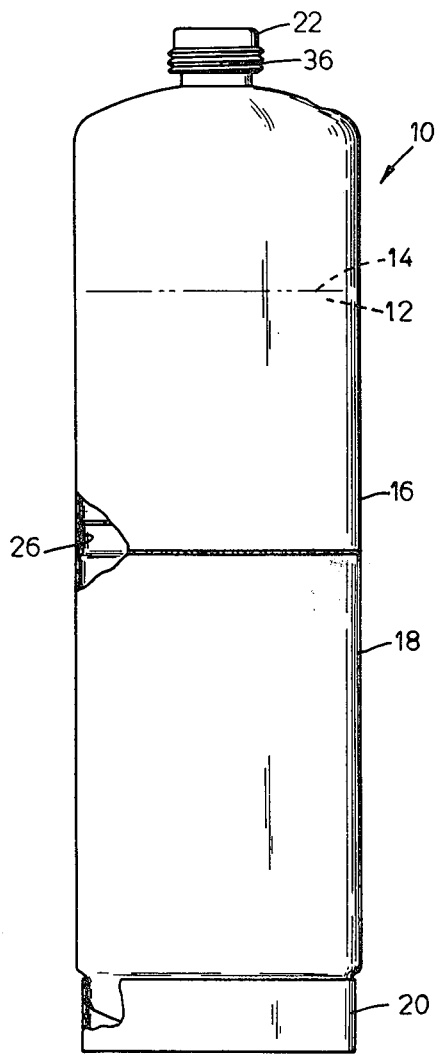
FIG. 1 is a side elevational view of a cylindrical metal gas storage container having component parts joined by brazed joints using an alloy in accordance with the present invention.
Figure 3:
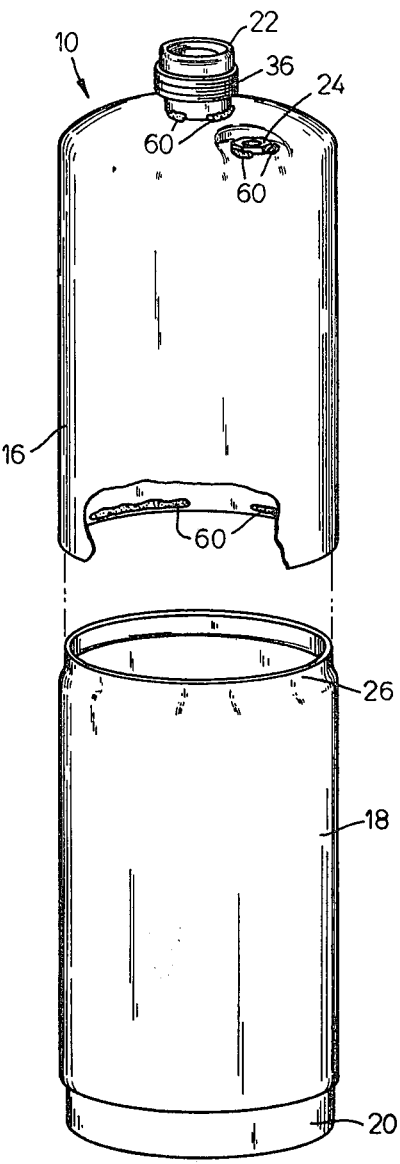
FIG. 3 is an isometric exploded view of the container shown in FIGS. 1 and 2 with a portion broken away and shows the manner in which extrudable brazing paste in accordance with the invention is applied to container component parts during one stage of manufacture.

Referring to FIGS. 1, 2 and 3, container 10 comprises a hollow cylindrical seamless upper section 16, a hollow cylindrical seamless lower section 18, a ring-like external base member 20, a fill valve assembly 22 and a relief valve assembly 24. The upper and lower sections 16 and 18, respectively, are fabricated, for example, by punching or drawing from sheet steel such as 10—10 carbon steel, but other suitable metal could be used. As FIGS. 1, 3, 4 and 5 show, the open end of lower section 18 is of slightly reduced diameter, as shown at 26 in FIG. 3, and is adapted to fit within the open end of upper section 16 in lapping relationship so that the two sections 16 and 18 can be joined together around the entire circumference by brazing.

Upper section 16 of container 10 is provided with a centrally located circular flanged opening 28 in which fill valve assembly 22 is mounted. Upper section 16 of container 10 is also provided with a circular flanged opening 44 in which relief valve assembly 24 is mounted.

Figure 5:
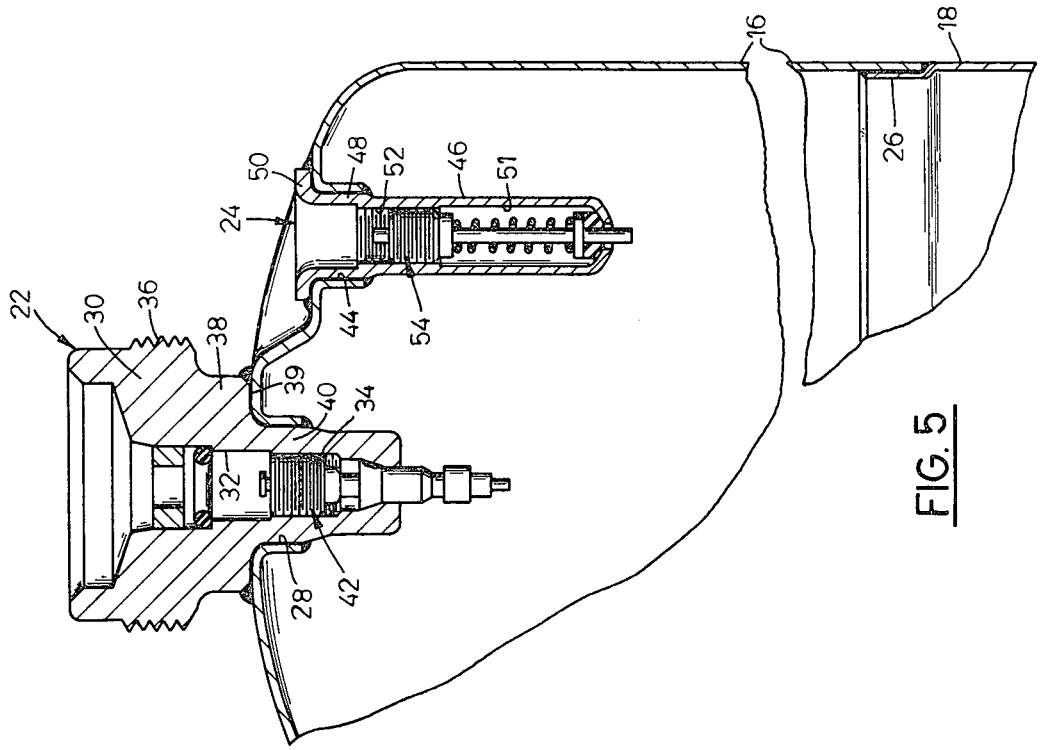
FIG. 5 is a view similar to FIG. 4 and shows the alloy dispersed in the joints after brazing.
Figure 4:
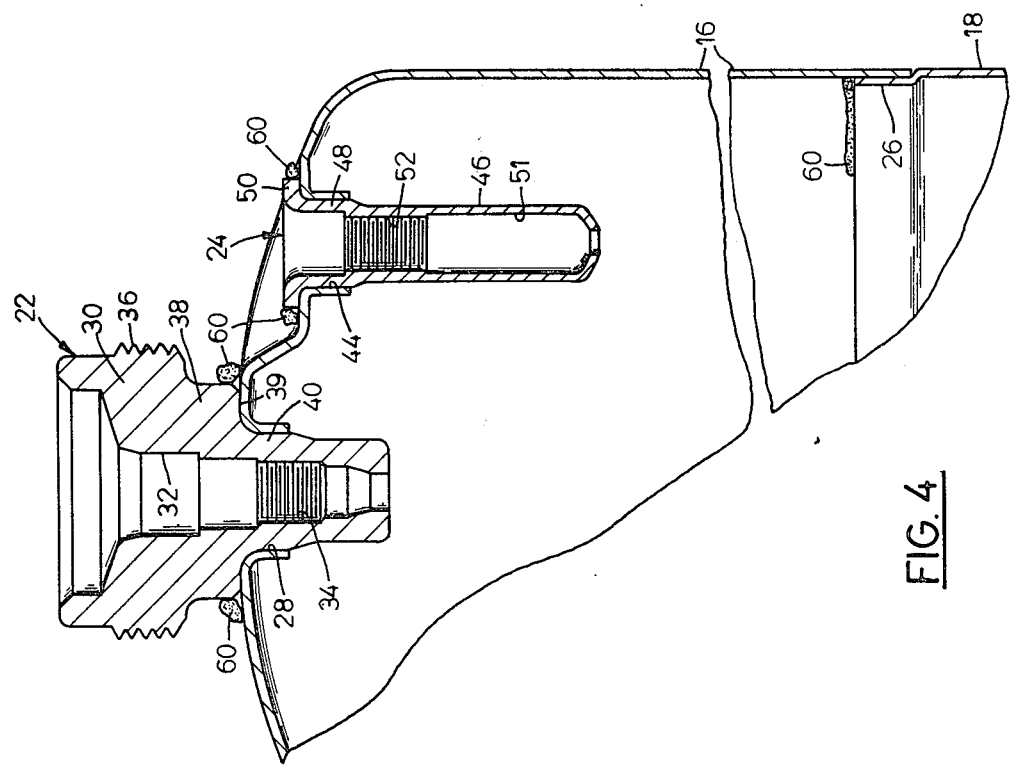
FIG. 4 is an enlarged cross sectional view of the upper portion of the container taken on line 4—4 of FIG. 2 and shows the disposition of brazing paste at the joints prior to heating.

As FIGS. 4 and 5 best show, fill valve assembly 22 comprises a fill valve housing 30 having a wide upper portion 38 and a reduced lower portion 40 which cooperate to define a shoulder 39. Fill valve housing 30 has a central bore 32, internal threads 34 in bore 32 for accommodating a fill valve 42, as FIG. 5 shows, and external threads 36. The fill valve 42 is not inserted in place until all brazing operations hereinafter described are completed and container 10 is ready to be filled with gas. Fill valve housing 30 extends through flanged hole 28 in upper section 16 of container 10. The clearance between adjacent portions of fill valve housing 30 and section 16 of container 10 is on the order of .003 inch so that brazing material in liquid form can flow therebetween by capillary action.

As FIGS. 4 and 5 also show, relief valve assembly 24 comprises a relief valve housing 46 having an upper portion 48 and a flange portion 50 integral therewith. Relief valve housing 46 has a central bore 51 and internal threads 52 in bore 51 for accommodating a relief valve 54 which is installed when container 10 is ready to be filled with gas. Relief valve housing 46 extends through flanged opening 44 in upper section 16 of container 10. The clearance between adjacent portions of relief valve housing 46 and section 16 of container 10 is on the order of 0.003 inch so that brazing material in liquid form can flow therebetween by capillary action.

As is apparent from the foregoing description, there are three joints to be brazed in container 10 and portions of the brazing material at these three joints, when solidified, will be exposed to pressurized gas within the filled container. However, the alloy in accordance with the invention is of such a character that it will not adversely react with the gas.

As FIGS. 3 and 4 show, it is preferably to apply the brazing paste in accordance with the invention near each of the three joints in the form of a small globule or ribbon 60 in such a position that, when fired, the powdered metals will melt, alloy and disperse in liquid form in the small clearance space between the component surfaces to be joined. The brazing paste is applied at the joint where valve housing 30 enters hole 28, at the joint where valve housing 46 enters hole 44, and along the inside edge of the opening at the lower end of section 16 prior to physically fitting the sections 16 and 18 together. The brazing paste is of such character, consistency and viscosity that it is easily ejected from the nozzles of conventional paste ejecting mechanisms to the points of application as required during manufacture. Its flow can be easily stopped after a sufficient amount is applied, and so that it adheres to the surface to which applied while the components are moved along the assembly line to various stations and into the furnace.

Oil, grime and grease can be removed from the metal surfaces to be joined prior to application of the brazing paste, if necessary, and this can be accomplished by the use of suitable solvents such as Alpha Reliasolve (Reg. TM) No. 563. However, the use of solvents to clean the surfaces to be brazed can be avoided if the component parts to be brazed are maintained relatively clean during manufacture and such contaminants as may exist will be removed by the reducing atmosphere maintained in the brazing furnace during the heating or firing operation.

The brazing paste in accordance with the invention comprises copper, phosphorous and nickel, each in powdered form suspended in a suitable gelatinous reducible vehicle hereinafter described. The copper, phosphorous and nickel powders make up about 75% by weight of the total weight of the paste, whereas the vehicle makes up the remainder. Of the total weight of copper, phosphorous and nickel in the paste, a preferred alloy in accordance with the invention comprises or consists of about 55% by weight of copper, about 6% by weight of phosphorous, and about 39% nickel. However, it has been found through experience that a suitable alloy can comprise or consist of about 48% to about 67% by weight of copper, about 4.5% to about 7% by weight of phosphorous, and the balance nickel. The amount of copper employed is insufficient to react adversely with MAPP Gas, for example, which is to be subsequently stored in container 10 but is sufficient, in combination with the nickel, to provide an alloy having the necessary strength and ductility to prevent the formation of a brittle finished joint which could easily be cracked as a result of deformation of the joint or adjacent portions of the container. The nickel serves as a suitable relatively low cost filler material necessary to maintain the percentage of copper at the desired level or within the desired range. The nickel also serves to provide an alloy having the necessary flow characteristics, mechanical strength and ductility. The nickel also serves to provide an alloy capable of melting at a predetermined temperature. The phosphorous serves to lower the melting point of the nickel to the necessary level.

It is to be understood that, although theThree basic materials in the alloy are relatively pure commercial grades, certain trace elements such as in (0.02%), manganese (0.001% to 0.01%), iron (0.03%), zinc (0.04%), lead (0.02%), silicon (0.005%), cobalt (0.1%) to 1.0%), antimony (0.003%) to 0.03%), aluminum (0.01%), boron (0.003% to 0.03%) and possibly small traces of other metals will appear in the alloy.

The vehicle in which the metallic particles of the brazing paste are suspended is a mixture, for example, of ethylene glycol, water and a biosaccharate, the latter substance being an organic gelatin-like compound. Vehicles of desired characteristics are commercially available. The principal function of the vehicle is to hold the metallic particles in suspension, to provide a paste of proper consistency for application, and to provide a paste having sufficient adhesive quality to enable it to retain its position on parts to which applied during the manufacturing operation and prior to firing.

In a preferred embodiment of the invention it was discovered that a brazing paste in accordance with the present invention and comprising or consisting of metal powder in the ratio of about 55% by weight copper, about 6% by weight phosphorous, and about 39% by weight nickel could be formulated by mixing four parts of copper brazing paste (commercially available as Alpha Reliabraze No. 2417) with five parts of nickel brazing paste (commercially available as Nicobraz No. 10 S, Type F). The above-identified copper brazing paste contains about 78% by weight of fine, high purity copper powder suspended in an inert vehicle and is commercially available from Alpha Metals, Inc, 4404 South Kildare Boulevard, Chicago, Illinois 60632, and is described in that company's Technical Bulletin No. 8a–10. The above-identified nickel brazing paste comprises about 62.02% by weight of fine, high purity nickel powder, about 29.85% by weight of copper powder and about 8.13% by weight of phosphorous suspended in an inert vehicle. The metal powders in the above-identified nickel brazing paste make up about 75% of the weight of paste. The aforementioned nickel brazing paste is commercially available from Wall Colmonoy Corporation, 19345 John R. Street, Detroit, Michigan 48203.

A brazing paste in accordance with the invention resulting from combining the two above-identified commercially available pastes is of such character and quality as to insure easy application and good adhesion, and does not run off the surface to which it is applied. Furthermore, it does not tend to dry unduly rapidly, to flake or to separate from the surfaces to which applied under normal working conditions. Furthermore, the vehicle is water soluble, has no fluxing properties of its own and is completely driven off in the course of the brazing operation in the reducing atmosphere in the furnace.

After the brazing paste in accordance with the invention is applied to the container joints as hereinbefore described, the container is placed for a period of approximately one hour in an electric furnace in which a temperature of 2,050° F. is maintained to effect melting and alloying of the powdered metals, flow of the alloy into the spaces between the components to be joined, and reduction of the paste vehicle. A reducing atmosphere is maintained within the furnace to clean the container surfaces for brazing and other purposes. The reducing atmosphere is obtained by effecting incomplete combustion of a mixture of natural gas and air and by directing the combustion products and the unburned mixture into the furnace wherein the unburned portion of the mixture is subsequently burned. During the incomplete combustion process, which takes place outside of the furnace inside of a known type of burner, about 55% of the mixture of natural gas and air is burned to provide combustion products. The reducing atmosphere in the oven or furnace is principally made up of a mixture of nitrogen, hydrogen, carbon dioxide and carbon monoxide. The reducing atmosphere serves to remove oxides from the surface of the metal container and facilitates the brazing operation. The consitituency of the brazing paste vehicle is such that it is reduced by the heat in the furnace and the constituent chemicals thereof break down or are converted into some of the same gases as are present in the reducing atmosphere in the furnace.

The alloy in accordance with the present invention is compatible with MAPP Gas and provides a finished brazed joint which is mechanically strong, resistant to high pressure forces within the container 10, and sufficiently ductile to resist cracking as a result of deformation of the container. Furthermore, in its liquid state the alloy has superior flow characteristics and forms a complete and perfect brazed joint. Furthermore, the alloy forms a fillet, as shown in FIG. 5, along each joint which enables visual inspection of the joint to provide assurance that the joint is sound.

We Claim:

1. A steel container for pressurized gas which tends to react with an alloy containing more than 67% copper to form an explosive compound; said container consisting of a plurality of components steel in sealed relationship by a brazing alloy of pressurized gas therebetween, being joined and brazing alloy being exposed to said pressurized gas within said container, said alloy consisting of: about 48% to about 67% by weight of copper; about 4.5% to about 7% by weight of phosphorous; and the balance nickel.

2. A container according to claim 1 wherein said brazing alloy consists of about 55% by weight of copper; about 6% by weight of phosphorous; and about 39% by weight of nickel.

* * * * *